(12) United States Patent
Kobayashi et al.

(10) Patent No.: US 11,079,258 B2
(45) Date of Patent: Aug. 3, 2021

(54) POSITION DETECTION ENCODER AND MANUFACTURING METHOD OF POSITION DETECTION ENCODER

(71) Applicant: MITUTOYO CORPORATION, Kanagawa (JP)

(72) Inventors: Hirokazu Kobayashi, Saitama (JP); Rie Arai, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 57 days.

(21) Appl. No.: 16/281,223

(22) Filed: Feb. 21, 2019

(65) Prior Publication Data

US 2019/0257674 A1 Aug. 22, 2019

(30) Foreign Application Priority Data

Feb. 21, 2018 (JP) .............................. JP2018-029187

(51) Int. Cl.
*G01D 5/347* (2006.01)
*G01D 5/245* (2006.01)

(52) U.S. Cl.
CPC ....... *G01D 5/34707* (2013.01); *G01D 5/2454* (2013.01); *G01D 5/34746* (2013.01); *G01D 5/34776* (2013.01)

(58) Field of Classification Search
CPC ............. G01D 5/34707; G01D 5/2454; G01D 5/34746; G01D 5/34776
See application file for complete search history.

(56) References Cited

U.S. PATENT DOCUMENTS

| 8,159,215 | B2 | 4/2012 | Kobayashi |
| 8,481,915 | B2 | 7/2013 | Otsuka et al. |
| 10,190,892 | B2 | 1/2019 | Kimura |
| 2011/0266424 | A1 | 11/2011 | Kawatoko et al. |
| 2015/0276435 | A1 | 10/2015 | Mori et al. |
| 2018/0143040 | A1* | 5/2018 | Kawatoko .......... G01D 5/34715 |
| 2018/0156640 | A1 | 6/2018 | Kobayashi et al. |

FOREIGN PATENT DOCUMENTS

JP 2008-064498 A 3/2008

* cited by examiner

*Primary Examiner* — Georgia Y Epps
*Assistant Examiner* — Don J Williams
(74) *Attorney, Agent, or Firm* — Greenblum & Bernstein, P.L.C.

(57) ABSTRACT

A position detection encoder includes a scale that has a position detection pattern and a linear pattern that is formed in a direction parallel to a length direction of the position detection pattern; and a position detector generating a position detection signal with a different value due to a displacement of the position detection pattern in the length direction. In the position detector, a position confirmation pattern is formed that includes two markers arranged at an interval equal to or less than an offset tolerance value for a positional relationship of the position detector and the scale in a width direction of the position detection pattern.

12 Claims, 7 Drawing Sheets

POSITION DETECTION ENCODER AND MANUFACTURING METHOD OF POSITION DETECTION ENCODER

CROSS-REFERENCE TO RELATED APPLICATIONS

The present application claims priority under 35 U.S.C. § 119 of Japanese Application No. 2018-029187, filed on Feb. 21, 2018, the disclosure of which is expressly incorporated by reference herein in its entirety.

BACKGROUND OF THE INVENTION

1. Field of the Invention

The present invention relates to a position detection encoder.

2. Description of Related Art

In a position detection encoder, a position of a measured object must be detected with a high degree of accuracy. Japanese Patent Laid-open Publication No. 2008-64498 discloses a technique for correcting a detection error in a position of a measured object due to positional offset of a component configuring a position detection encoder.

By using the technique described in Japanese Patent Laid-open Publication No. 2008-64498, even when the position of the component configuring the position detection encoder is offset, detection accuracy for the position of the measured object can be improved by correcting detection results. However, in the conventional technology, an additional pattern specialized for a correction use, in addition to position detection use, must be formed on a scale and a special computation and the like for correction use is required in order to be able to perform a correction.

SUMMARY OF THE INVENTION

In view of these circumstances, the present invention provides a technology that easily adjusts a positional relationship of a component configuring a position detection encoder.

One aspect of the present invention is a position detection encoder that includes a scale including a position detection pattern and a linear pattern that is formed in a direction parallel to a long direction of the position detection pattern; and a position detector generating a position detection signal that changes due to a displacement of the position detection pattern in the long direction. In the position detector, a position confirmation pattern is formed that includes two markers arranged at an interval equal to or less than an offset tolerance value for a positional relationship of the position detector and the scale in a short direction of the position detection pattern.

The position confirmation pattern may be formed at a position where the position detector can receive a signal indicating the position of the scale via the position detection pattern in a state where a predetermined range of the linear pattern is included between the two markers when the scale is displaced in the long direction. In the position detector, a plurality of position confirmation patterns may be formed at different positions in the long direction.

The plurality of position confirmation patterns may be formed at positions where the position detector can output a normal position detection signal in a state where the predetermined range of the linear pattern is included between the two markers belonging to the respective position confirmation patterns.

The position confirmation pattern may further include at least one auxiliary marker that is arranged at a position on a straight line connecting the two markers. The at least one auxiliary marker may be arranged between the two markers.

The position confirmation pattern may also include a plurality of auxiliary markers, and when an interval between adjacent auxiliary markers of the plurality of auxiliary markers is defined as $\Delta$, a distance between the plurality of position confirmation patterns is defined as L, and an offset tolerance value in a yawing direction between the scale and the position detector is defined as $\theta$, the position confirmation pattern may satisfy the relation $\theta > \tan^{-1}(\Delta/L)$.

The scale may have a plurality of linear patterns that are formed so as to be in contact with both ends of the position detection pattern in the short direction of the position detection pattern. The scale may include an absolute position detection pattern for detecting an absolute position and a relative position detection pattern for detecting a relative position, and the linear pattern may be formed at a boundary position of the absolute position detection pattern and the relative position detection pattern.

Another aspect of the present invention is a manufacturing method of a position detection encoder that is provided with a scale including a position detection pattern and a linear pattern that is formed in a direction parallel to a long direction of the position detection pattern; and a position detector generating a position detection signal that changes due to a displacement of the position detection pattern in the long direction, the position detector being formed with a position confirmation pattern that includes two markers arranged at an interval equal to or less than an offset tolerance value for a positional relationship between the position detector and the scale in a short direction of the position detection pattern. The manufacturing method includes a displacement step displacing the scale in the long direction and a determination step determining whether the linear pattern is included between the two markers while performing the displacement in the long direction.

According to the present invention, a positional relationship of a component configuring a position detection encoder can be adjusted easily.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

Configuration of Measuring Apparatus S

Figure 1:
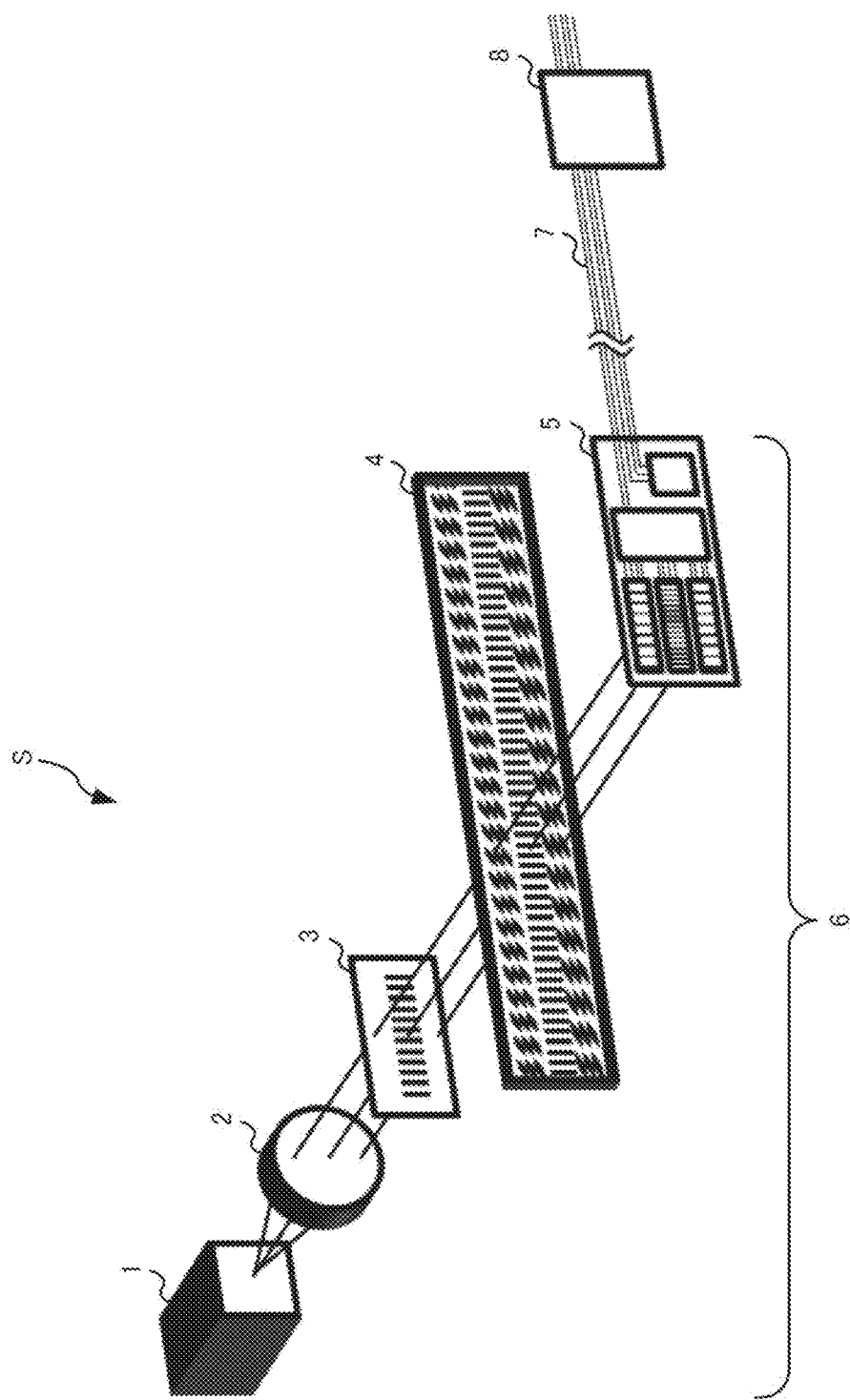
FIG. 1 schematically illustrates a configuration of a measuring apparatus.

FIG. 1 schematically illustrates a configuration of a measuring apparatus S. The measuring apparatus S measures a position of a measured object using an incremental system and an absolute system. The incremental system measures the position by continuously identifying a relative position of a scale with respect to an initial position set after starting an operation. The absolute system measures the position by identifying an absolute position of the scale with respect to a predetermined measurement reference position set before starting the operation.

The measuring apparatus S includes a light source 1, a lens 2, an optical lattice 3, a scale 4, a position detector 5, a cable 7, and a processing apparatus 8. The light source 1, the lens 2, the optical lattice 3, the scale 4, and the position detector 5 serve as a position detection encoder 6. The cable 7 serves as a transmission channel to transmit a serial signal sent by the position detector 5. The processing apparatus 8 sends the serial signal including control data for controlling the position detector 5 via the cable 7 (transmission channel).

The light source 1 is a device serving as an optical emitter that emits light and is a light emitting diode (LED), for example. The light source 1 is provided at an orientation that emits light toward the lens 2.

The lens 2 changes an orientation of incident light from the light source 1 such that the light emitted from the light source 1 illuminates a predetermined region of the scale 4. Specifically, the lens 2 converts the light emitted by the light source 1 to a parallel light beam such that the light emitted by the light source 1 reaches the position detector 5 by passing through a plurality of tracks formed on the scale 4. The light converted to the parallel light beam by the lens 2 strikes the optical lattice 3.

The optical lattice 3 makes a degree of illumination of the incident light arriving via the lens 2 uniform. Specifically, the optical lattice 3 is configured to make an illumination distribution of the parallel light beam incident from the lens 2 uniform in a region where light is detected inside the position detector 5. In a case where the illumination distribution of the parallel light beam emitted from the lens 2 is uniform, the optical lattice 3 may not be provided to the measuring apparatus S.

Figure 2:
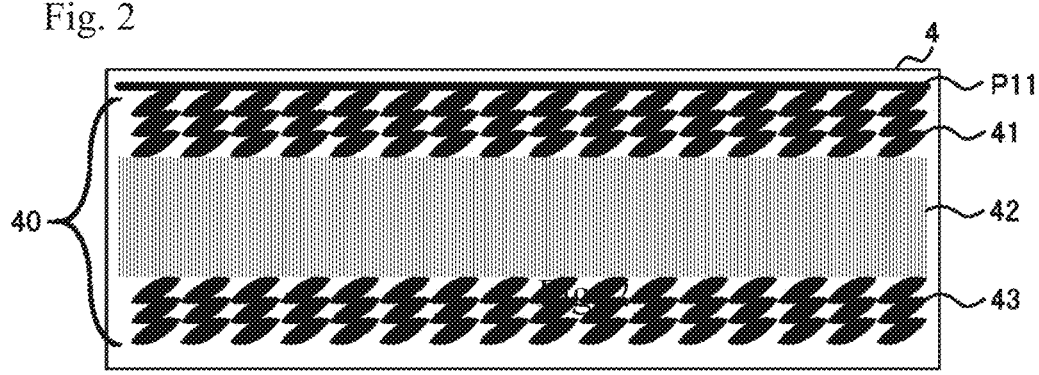
FIG. 2 illustrates a configuration of a scale.

FIG. 2 illustrates a configuration of the scale 4. The scale 4 is a panel that allows at least a portion of the light emitted from the light source 1 to pass through and includes a plurality of tracks with respectively different patterns. The scale 4 includes a position detection pattern 40 that is used for detecting a position of a measured object and a linear pattern P11 that is used for checking a positional relationship of the scale 4 and the position detector 5.

As shown in FIG. 2, the position detection pattern 40 has, in a long direction (length direction) of the scale 4, a first track 41, a second track 42, and a third track 43 where a light transmitting region and a light non-transmitting region are arranged parallel to each other in sequence. The linear pattern P11 is a line formed in a direction parallel to the long direction of the position detection pattern 40. In the first track 41, second track 42, and third track 43, the scale 4 partially transmits incident light arriving via the optical lattice 3 and generates transmitted light having a different intensity according to the position inside the position detector 5.

The first track 41 and the third track 43 are in an absolute scale pattern (hereafter referred to as an ABS pattern) which is used for specifying the position of the measured object using the absolute system. A pattern cycle of the first track 41 differs from the pattern cycle of the third track 43.

The second track 42 is in an incremental scale pattern (hereafter referred to as an INC pattern) which is used for specifying the position of the measured object using the incremental system. The pattern cycle of the second track 42 is shorter than the pattern cycles of the first track 41 and the third track 43.

Returning to FIG. 1, the position detector 5 is a light-receiving module for generating a position detection signal that changes by displacing the position detection pattern 40 in the long direction. The position detector 5 includes a substrate on which is mounted a photoreceiver element that outputs a light signal in accordance with the light intensity received via the first track 41, second track 42, and third track 43, respectively. The photoreceiver element is a photoelectric element that converts light into electric current. The substrate on which the photoreceiver element is mounted is a glass substrate, for example, and is formed with a wiring pattern for sending the position detection signal output by the photoreceiver element to the processing apparatus 8. The position detector 5 outputs the position detection signal having a value corresponding to an amount of light received by the photoreceiver element, which changes due to the displacement of the position detection pattern 40 in the long direction.

The position detection encoder 6 in the instant specification is described as a photoelectric encoder, but may be another type of encoder such as an electrostatic encoder or an electromagnetic induction encoder. When the position detection encoder 6 is an electrostatic encoder, the position detector 5 outputs a signal corresponding to a change in capacitance. When the position detection encoder 6 is an electromagnetic induction encoder, the position detector 5 outputs a signal corresponding to a displacement amount that is based on the electromagnetic induction. In addition, the position detection encoder 6 in the instant specification is described as an absolute system encoder having the ABS pattern and the INC pattern, but, may be an incremental system encoder having only the INC pattern. The following is a detailed description of the position detector 5.

Configuration of Position Detector 5

Figure 3A:
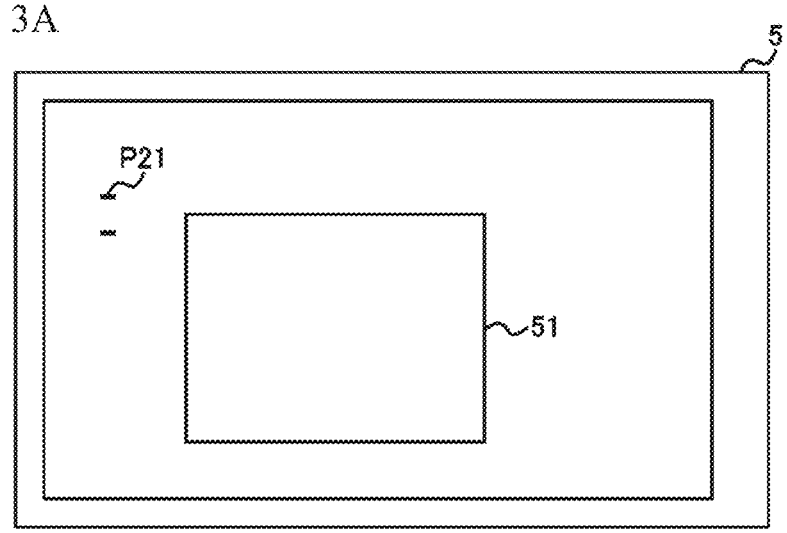
FIGS. 3A and 3B illustrate a configuration of a position detector according to a first embodiment.
Figure 3B:
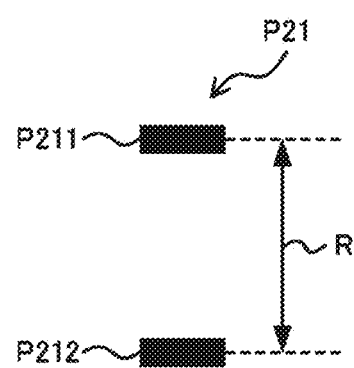

FIGS. 3A and 3B illustrate a configuration of the position detector 5 according to a first embodiment. The position detector 5 includes a photoreceiver 51 that generates the position detection signals that have different values due to the displacement of the position detection pattern 40 in the long direction.

In the scale 4 noted above, the plurality of tracks having the light transmitting region and the light non-transmitting region are arranged in a short direction (width direction) orthogonal to the long direction of the scale 4. When the position of the position detector 5 in the short direction diverges from a design value (hereafter referred to as a lateral offset position), cross talk may occur between the plurality of light signals that the photoreceiver 51 receives and the intensity of the light signal that the photoreceiver 51 receives may be reduced. As a result, accuracy in the position detection by the position detector 5 may be reduced.

As shown in FIG. 3A, a position confirmation pattern P21 is formed in the glass substrate of the position detector 5, and is used when adjusting the lateral offset position using the linear pattern P11 formed in the scale 4. Specifically, the position detector 5 is formed with the position confirmation pattern P21 which, as shown in FIG. 3B, includes two markers P211 and P212 that are arranged at an interval R that is equal to or less than an offset tolerance value for the positional relationship between the position detector 5 and the scale 4 in the short direction of the position detection pattern 40. The offset tolerance value is a value corresponding to an amount of offset when the cross talk of the light signal or an amount of reduction in intensity of the light signal is an allowable value.

The position confirmation pattern P21 is formed in a position where the position detector 5 can receive a signal indicating the position of the scale 4 via the position detection pattern 40 in a state where a predetermined range of the linear pattern P11 is included between the two markers P211 and P212 when the scale 4 is displaced in the long direction. The signal indicating the position of the scale 4 is, for example, the light that changes due to the displacement of the scale 4 in the photoelectric encoder, the capacitance that changes due to the displacement of the scale 4 in the electrostatic encoder, or the like. The signal indicating the position of the scale 4 in the instant specification is described as the light in the photoelectric encoder. Specifically, the position confirmation pattern P21 is formed in a position where the cross talk of the light signal or the amount of reduction in intensity of the light signal is in an allowable range in a state where the predetermined range of the linear pattern P11 is included between the two markers P211 and P212.

Manufacturing Method of Position Detection Encoder 6

In a process of manufacturing the position detection encoder 6, an operator, for example, displaces the scale 4 in the long direction while using a microscope to watch a vicinity of the position confirmation pattern P21, and determines whether the linear pattern P11 is included between the two markers P211 and P212 while performing the displacement of the scale 4 in the long direction. The operator reaches a determination of "normal" when the entire linear pattern P11 is included between the two markers P211 and P212, and "abnormal" when the entire linear pattern P11 is not included between the two markers P211 and P212. When the operator determines that there is an abnormality, the operator adjusts the positional relationship of the scale 4 and the position detector 5, and then makes a determination again.

At least a portion of the manufacturing process noted above may be performed by a computer. For example, the scale 4 may be displaced in the long direction under control of the computer. While performing the displacement in the long direction, by capturing images of an area around the position confirmation pattern P21 and by analyzing the captured images with the computer, the determination may be made as to whether the linear pattern P11 is included between the two markers P211 and P212.

Benefits of First Embodiment

As described above, in the position detection encoder 6 according to the first embodiment, the scale 4 includes the linear pattern P11 and the position detector 5 includes the position confirmation pattern P21. By the position detection encoder 6 having such a configuration, the operator can easily confirm if there is an offset in the lateral offset position by checking whether the linear pattern P11 is included between the two markers P211 and P212 of the position confirmation pattern P21 during the manufacturing process of the position detection encoder 6. As a result, using the position detection encoder 6, the positional relationship of the component configuring the position detection encoder 6 can be adjusted easily.

In addition, by the position detection encoder 6 having such a configuration, it is possible to check whether there is offset in the lateral offset position without measuring an amount of positional offset, and therefore the costs of investing in equipment such as cameras and measurement software can be reduced. In addition, in a case where the amount of positional offset is measured using a received signal, the adjustment work has to be performed in an environment in accordance with the type of the position detection encoder 6: for example, when the position detection encoder 6 is the photoelectric encoder, the adjustment work needs to be performed in a dark place. However, according to the position detection encoder 6, it is possible to check whether there is offset in the lateral offset position without measuring the amount of positional offset, and therefore the positional relationship of the component configuring the position detection encoder 6 can be adjusted without being affected by the environment.

Further, in a case where one of an adhesion of the scale 4, a mechanism fixating the scale 4 (not shown in the drawings), and the position detector 5 is tilted, the operator can check the displacement of the linear pattern P11 approaching a first marker of the position confirmation pattern P21 and moving away from a second marker when the scale 4 is displaced in the long direction. By performing such a check in an intermediate survey conducted in the midst of manufacturing the position detection encoder 6, it is possible to prevent the process from being performed again due to finding positional offset of the member in a final inspection which is performed after the position detection encoder 6 has been manufactured.

First Modification

Figure 4:
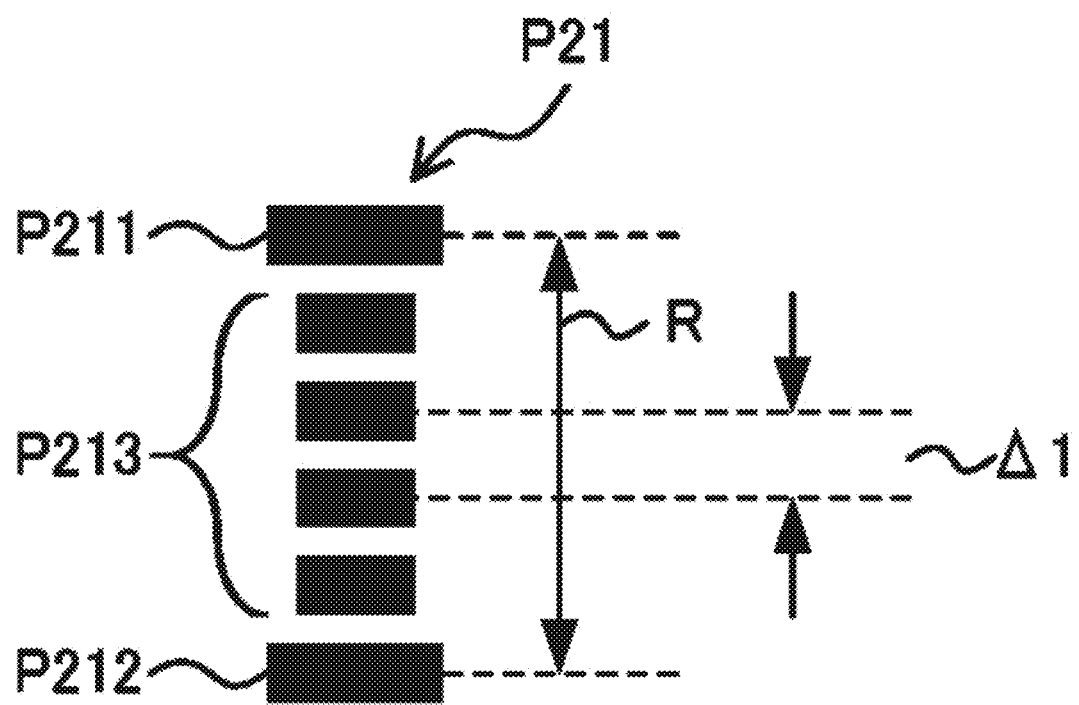
FIG. 4 schematically illustrates a configuration of a modification of a position confirmation pattern.

In the foregoing description, an example is given where the position detector 5 includes the position confirmation pattern P21 having two markers P211 and P212, however, the markers included in the position confirmation pattern P21 are not limited to the two markers P211 and P212. FIG. 4 schematically illustrates a configuration of a modification of the position confirmation pattern P21. As shown in FIG. 4, the position confirmation pattern P21 is positioned on a straight line that connects the two markers P211 and P212 and may further include auxiliary markers P213 arranged between the two markers P211 and P212. In FIG. 4, an example is given where the position confirmation pattern P21 includes four auxiliary markers P213.

In this case, the auxiliary markers P213 are arranged at an interval Δ1 equal to or less than ½ of the offset tolerance value for the lateral offset position, for example. In the position confirmation pattern P21 illustrated in FIG. 4, four auxiliary markers are arranged at an interval of ⅕ of the offset tolerance value for the lateral offset position. In a case where only the two markers P211 and P212 are included in the position confirmation pattern P21, the operator can only determine whether or not the position detector 5 is within the offset tolerance value for the lateral offset position. However, by the position confirmation pattern P21 further having the auxiliary markers P213, the operator can confirm a degree to which the lateral offset position is offset.

Second Modification

Figure 5:
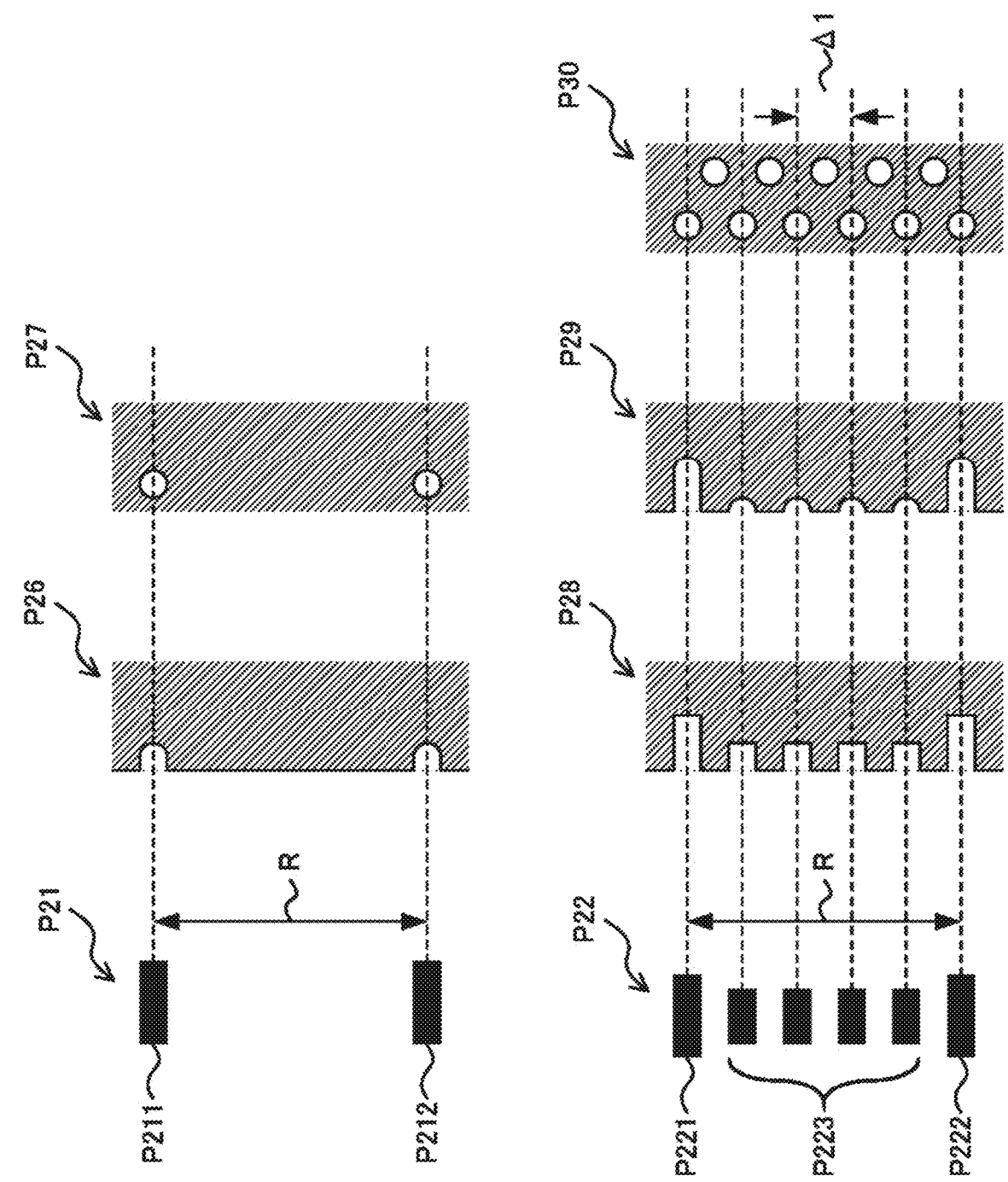
FIG. 5 schematically illustrates a configuration of a modification of the position confirmation pattern.

In the description above, an example is given where the substrate on which the photoreceiver element is mounted is the glass substrate, however the substrate is not always transparent. FIG. 5 schematically illustrates a modified configuration of the position confirmation pattern P21. For example, when the substrate is a non-transparent substrate such as a printed circuit board (PCB), a plurality of holes may be formed in the substrate as scale marks. For example, a plurality of semicircular, V-shaped, or other notches on an end face, a plurality of patterns near an edge, or a plurality of circular holes and the like may be formed in the substrate as the position confirmation pattern P21. In this case, the plurality of notches and the like formed in the substrate may be formed at a position where the position detector 5 can receive light arriving via the position detection pattern 40 in a state where a predetermined range of the linear pattern P11 is included between the plurality of notches and the like.

Specifically, as with position confirmation pattern P26 in FIG. 5, the substrate may have the plurality of semicircular notches formed on the end face at positions corresponding respectively to the two markers P211 and P212 included in the position confirmation pattern P21. In addition, as with position confirmation pattern P27 in FIG. 5, the substrate may have the plurality of circular holes formed at positions corresponding respectively to the two markers P211 and P212 included in the position confirmation pattern P21.

Further, as with position confirmation patterns P28 and P29 in FIG. 5, the substrate may have the plurality of semicircular or square notches formed on the end face at positions corresponding respectively to the two markers P221 and P222, and the plurality of auxiliary markers P223 included in a position confirmation pattern P22. Furthermore, as with position confirmation pattern P30 in FIG. 5, the substrate may have the plurality of circular holes formed alternately at positions corresponding respectively to the two markers P221 and P222 and the plurality of auxiliary markers P223, and also at positions corresponding respectively to between a marker and an auxiliary marker or between two auxiliary markers included in the position confirmation pattern P22. In this way, in the manufacturing process of the position detection encoder 6, the operator can easily confirm if there is an offset in the lateral offset position by checking light passing through the plurality of holes formed in the substrate.

Second Embodiment

Enabling Detection of Positional Offset in Yawing Direction

Next, a second embodiment is described. In the position detection encoder 6 according to the first embodiment, the position detector 5 includes one position confirmation pattern. However, checking the positional offset in a yawing direction (inclination of the scale 4 and the position detector 5) is difficult using one position confirmation pattern. Given this, the position detection encoder 6 according to the second embodiment includes a plurality of position confirmation patterns in a long direction of the position detector 5. Hereafter, a description is provided of a portion that differs from the first embodiment. Portions identical to those of the first embodiment are omitted where appropriate.

Figure 6A:
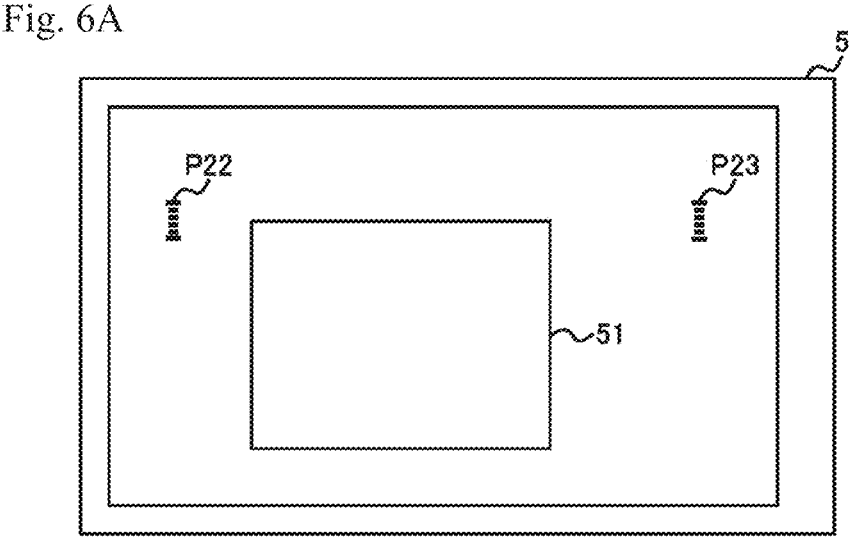
FIGS. 6A to 6C illustrate a configuration of a position detector according to a second embodiment.
Figure 6B:
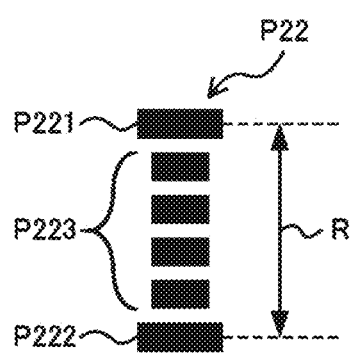
Figure 6C:
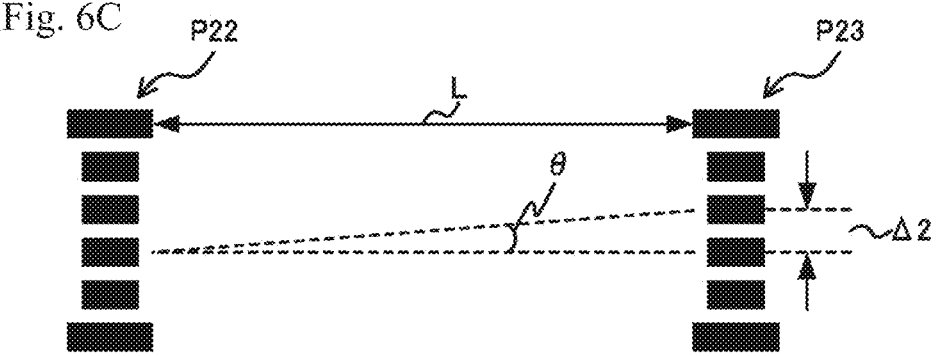

FIGS. 6A to 6C illustrate a configuration of the position detector 5 according to the second embodiment. In the position detector 5 according to the second embodiment, a plurality of position confirmation patterns are formed at different positions in the long direction. As shown in FIG. 6A, the position confirmation pattern P22 positioned on a left side of the photoreceiver 51 and a position confirmation pattern P23 positioned on a right side of the photoreceiver 51 are formed in the position detector 5. The position confirmation patterns P22 and P23 are formed at positions where the position detector 5 can output a normal position detection signal in a state where a predetermined range of the linear pattern P11 formed in the scale 4 is included between two markers (such as markers P221 and P222) belonging to each. The distance between the position confirmation pattern P22 and the position confirmation pattern P23, and the distance between the markers of the position confirmation pattern P22 and the position confirmation pattern P23 are defined to a distance where it is possible to detect whether or not the positional offset in the yawing direction is within an allowable range. When the position detector 5 has such a plurality of position confirmation patterns, the positional offset between the scale 4 and the position detector 5 in the yawing direction can easily be confirmed.

The position confirmation pattern may further include at least one auxiliary marker that is arranged at a position on a straight line connecting the two markers. Specifically, at least one auxiliary marker is arranged between the two markers. More specifically, as shown in FIG. 6B, the position confirmation pattern P22 includes four auxiliary markers P223 arranged between the two markers P221 and P222. In this way, when the position detection pattern has the auxiliary markers, an amount of positional offset in the yawing direction can be detected with a high degree of accuracy.

Figure 7:
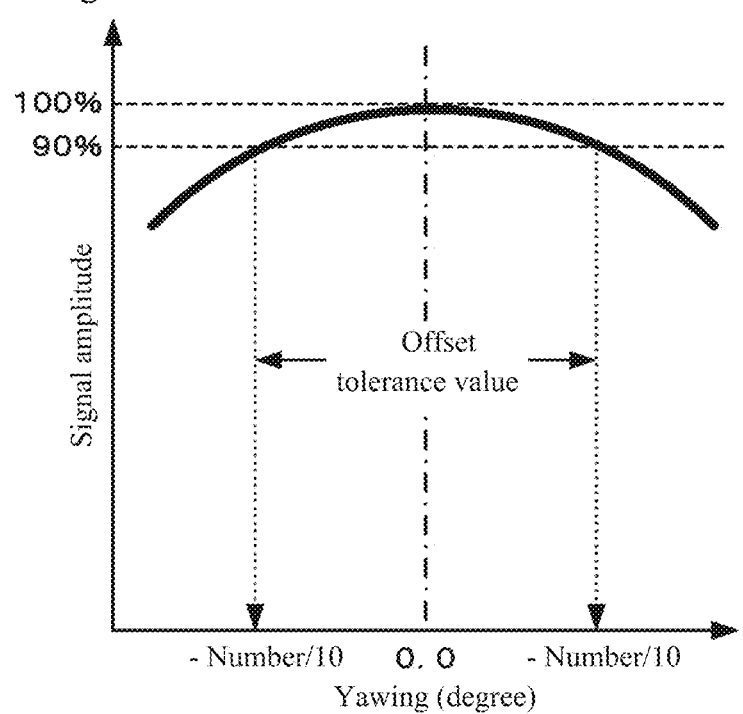
FIG. 7 illustrates a relationship between signal amplitude and an amount of positional offset in a yawing direction.

FIG. 7 illustrates a relationship between signal amplitude and an amount of positional offset in the yawing direction. The vertical axis in FIG. 7 indicates a ratio of the amplitude of a light signal that the photoreceiver 51 receives to a maximum value, and the horizontal axis indicates an angle of positional offset in the yawing direction when a center is 0.0°. As shown in FIG. 7, the offset tolerance value in the yawing direction is determined based on a range for which an amount of reduction of the amplitude of the light signal is allowed. When the offset tolerance value in the yawing direction is exceeded, the signal intensity of the position detector 5 decreases and the accuracy of detecting the position of the measured object decreases. Given this, as shown in FIG. 6C, when an interval between the four adjacent auxiliary markers is defined as Δ2, a distance between the two position confirmation patterns P22 and P23 is defined as L, and an offset tolerance value between the scale 4 and the position detector 5 in the yawing direction is defined as θ, a plurality of the auxiliary markers P223 are arranged at an interval satisfying the relation $\theta > \tan^{-1}(\Delta 2/L)$.

Manufacturing Method of Position Detection Encoder 6

In a process of manufacturing the position detection encoder 6, the operator displaces the scale 4 in the long direction while using a microscope to watch a vicinity of the position confirmation patterns P22 and P23, for example. While performing the displacement in the long direction, a determination is made as to whether or not the linear pattern P11 is included between two corresponding, adjacent auxiliary markers or between a marker and an auxiliary marker in the plurality of position confirmation patterns. "The two corresponding auxiliary markers" are auxiliary markers having the same position in the short direction of the scale 4.

The operator reaches a determination of "normal" (for example, the amount of offset in the yawing direction is less than θ) when the entire linear pattern P11 is included between two corresponding, adjacent auxiliary markers or between a marker and an auxiliary marker in the plurality of position confirmation patterns, and reaches a determination of "abnormal" when the entire linear pattern P11 is not included between two adjacent auxiliary markers or between a marker and an auxiliary marker. When the operator determines that there is an abnormality, the operator adjusts the positional relationship of the scale 4 and the position detector 5, and then makes a determination again.

At least a portion of the manufacturing process noted above may be performed by a computer. For example, the scale 4 may be displaced in the long direction under control of the computer. While performing the displacement in the long direction, by capturing images of an area around the position confirmation patterns P22 and P23 and by analyzing the captured images with the computer, the determination may be made as to whether the linear pattern P11 is included between the two adjacent auxiliary markers or between the marker and the auxiliary marker for the plurality of position confirmation patterns, respectively.

Benefits of Second Embodiment

As described above, in the position detection encoder 6 according to the second embodiment, the position detector 5 includes the plurality of position confirmation patterns that have at least one auxiliary marker that is arranged between two markers. By the position detection encoder 6 having such a configuration, the operator can easily confirm, in the manufacturing process of the position detection encoder 6, whether there is positional offset in the yawing direction by checking whether the linear pattern P11 is included between two adjacent auxiliary markers or between a marker and an auxiliary marker for the plurality of position confirmation patterns, respectively.

Modification

Figure 8A:
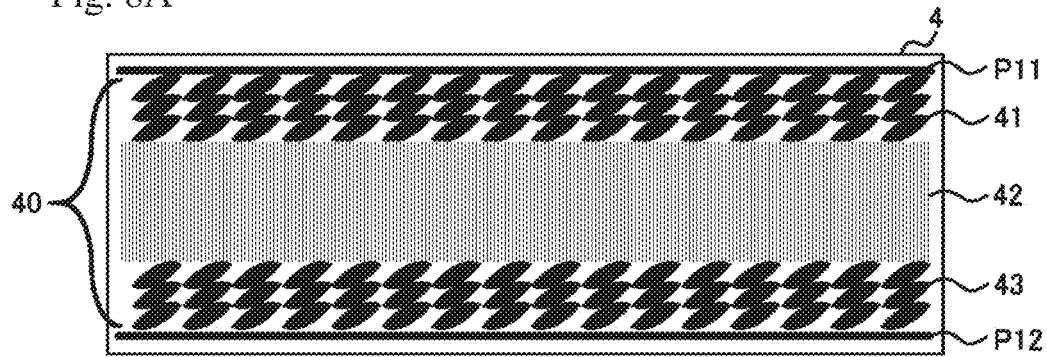
FIGS. 8A and 8B illustrate a configuration of a modification of the scale.
Figure 8B:
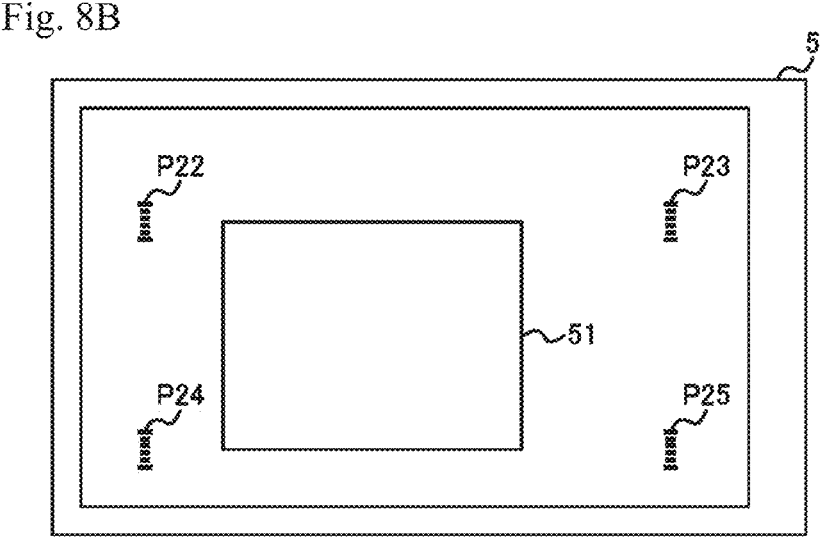
Figure 9:
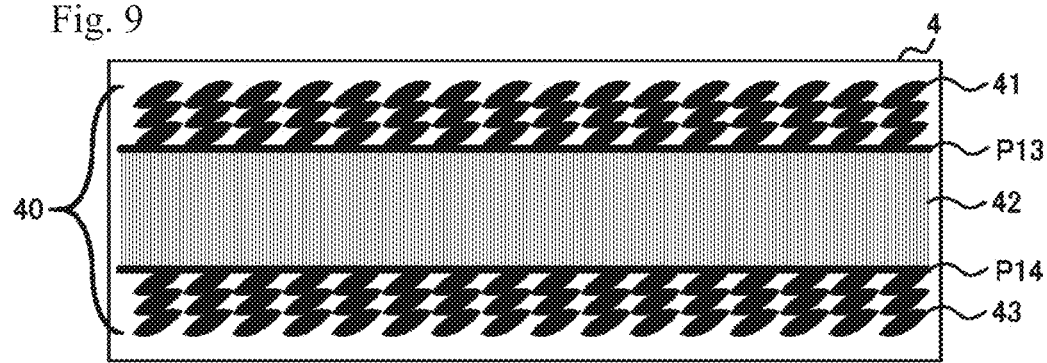
FIG. 9 illustrates a configuration of a modification of the scale.

In the foregoing description, an example is given where the scale 4 includes one linear pattern P11. However, the number of linear patterns that the scale 4 has is not limited to one. FIGS. 8A, 8B, and 9 illustrate modified configurations of the scale 4. The scale 4 may include a plurality of linear patterns that are formed so as to be in contact with both ends of the position detection pattern 40 in the short direction of the position detection pattern. As shown in FIG. 8A, in addition to the linear pattern P11 formed above the first track 41, the scale 4 may have a linear pattern P12 formed below the third track 43, positioned on the opposite side from the linear pattern P11.

In this case, as shown in FIG. 8B, the position confirmation patterns P22 and P23, which are arranged such that the linear pattern P11 is included in a predetermined range when the positional relationship of the scale 4 and the position detector 5 is normal, and position confirmation patterns P24 and P25, which are arranged such that the linear pattern P12 is included in a predetermined range when the positional relationship of the scale 4 and the position detector 5 is normal, are formed on the position detector 5. In this way, the operator can check, according to the type of the position detection encoder 6, whether there is offset in the positional relationship of the scale 4 and the position detector 5 based on the readily visible position confirmation pattern.

In addition, by arranging a linear pattern on both ends in the short direction of the position detection pattern of the scale 4, it is possible to form the linear pattern at a position that does not overlap with the position detection pattern. Further, when manufacturing the scale 4, etching is performed on a shape that ends in a sharp point, such as a forefront end of the ABS pattern, which reduces stability during the manufacturing. However, by forming the linear patterns at both ends of the scale 4, it is possible to form the linear patterns at positions distant from the forefront end of the ABS pattern, therefore improving stability during the manufacturing.

Forming the linear patterns on both ends of the scale 4 in the short direction may be difficult because of limited surface area. In the scale 4 having the ABS pattern and the INC pattern, a linear pattern may be formed at a boundary position of the ABS pattern and INC pattern. As shown in FIG. 9, the scale 4 may have a linear pattern P13 at the boundary position of the first track (ABS pattern) and the second track (INC pattern) and may have a linear pattern P14 at the boundary position of the second track and the third track (ABS pattern). In this way, it is possible to form the linear patterns on the scale 4 in a wider area than both ends of the scale 4 in the short direction.

The present invention is described above by way of embodiments, but the technical scope of the present invention is not limited to that described in the embodiments above, and various modifications are possible within the scope of the description. For example, the specific embodiments of separated or integrated devices are not limited to the embodiment given above, and all or a portion thereof can be configured to be functionally or physically separated or integrated in any desired units. In addition, novel embodiments produced by the arbitrary combination of a plurality of embodiments are also included in the scope of the embodiments of the present invention. The benefits of a novel embodiment produced by such combination also include the benefits of the original embodiment of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A position detection encoder comprising:
a scale comprising:
a position detection pattern; and
a linear pattern extending in a direction parallel to a length direction of the position detection pattern; and
a position detector that generates a position detection signal that changes due to a displacement of the position detection pattern in the length direction, the position detector comprising:
a position confirmation pattern which includes two markers arranged at an interval less than or equal to an offset tolerance value for a positional relationship of the position detector and the scale in a width direction of the position detection pattern.

2. The position detection encoder according to claim 1, wherein the position confirmation pattern is formed at a position where the position detector can receive a signal indicating the position of the scale via the position detection pattern, in a state where a predetermined range of the linear pattern is included between the two markers, when the scale is displaced in the length direction.

3. The position detection encoder according to claim 1, wherein the position confirmation pattern comprises a plurality of position confirmation patterns formed at different positions in the length direction.

4. The position detection encoder according to claim 3, wherein the different positions include positons where the position detector can output a normal position detection signal in a state where the predetermined range of the linear pattern is included between the two markers belonging to a respective position confirmation pattern of the plurality of position confirmation patterns.

5. The position detection encoder according to claim 3, wherein a position confirmation pattern of the plurality of position confirmation patterns further comprises at least one auxiliary marker that is arranged at a position on a straight line connecting the two markers.

6. The position detection encoder according to claim 5, wherein at least one auxiliary marker is arranged between the two markers.

7. The position detection encoder according to claim 1, wherein the linear pattern comprises a plurality of linear patterns arranged so as to be in contact with both ends of the position detection pattern in the width direction of the position detection pattern.

8. The position detection encoder according to claim 1, wherein the scale further comprises:
an absolute position detection pattern for detecting an absolute position; and
a relative position detection pattern for detecting a relative position, wherein the linear pattern is formed at a boundary position of the absolute position detection pattern and the relative position detection pattern.

9. The position detection encoder according to claim 1, wherein:
the linear pattern includes a linear border extending uninterruptedly in the direction parallel to the length direction of the position detection pattern.

10. A position detection encoder comprising:
a scale comprising:
a position detection pattern; and
a linear pattern extending in a direction parallel to a length direction of the position detection pattern; and
a position detector that generates a position detection signal that changes due to a displacement of the position detection pattern in the length direction, the position detector comprising:
a position confirmation pattern which includes two markers arranged at an interval less than or equal to an offset tolerance value for a positional relationship of the position detector and the scale in a width direction of the position detection pattern, wherein:
the position confirmation pattern comprises a plurality of position confirmation patterns formed at different positions in the length direction,
a position confirmation pattern of the plurality of position confirmation patterns further comprises at least one auxiliary marker that is arranged at a position on a straight line connecting the two markers,
each position confirmation pattern of the plurality of position confirmation patterns includes a plurality of auxiliary markers, and
when an interval between adjacent auxiliary markers of the plurality of auxiliary markers is defined as $\alpha$, a distance between the plurality of position confirmation patterns is defined as $L$, and an offset tolerance value in a yawing direction between the scale and the position detector is defined as $\theta$, the position confirmation pattern satisfies the relation $\theta > \tan^{-1}(\alpha/L)$.

11. A method of manufacturing a position detection encoder, the encoder having a scale including a position detection pattern and a linear pattern that is formed in a direction parallel to a length direction of the position detection pattern, and a position detector generating a position detection signal that changes due to a displacement of the position detection pattern in the length direction, the position detector being formed with a position confirmation pattern that includes two markers arranged at an interval equal to or less than an offset tolerance value for a positional relationship of the position detector and the scale in a width direction of the position detection pattern, the method comprising:
displacing the scale in the length direction; and
determining whether the linear pattern is included between the two markers while performing the displacement in the length direction.

12. The method of manufacturing a position detection encoder according to claim 11, wherein:
the linear pattern includes a linear border extending uninterruptedly in the direction parallel to the length direction of the position detection pattern.

* * * * *

UNITED STATES PATENT AND TRADEMARK OFFICE
CERTIFICATE OF CORRECTION

PATENT NO. : 11,079,258 B2  
APPLICATION NO. : 16/281223  
DATED : August 3, 2021  
INVENTOR(S) : H. Kobayashi et al.

Page 1 of 1

It is certified that error appears in the above-identified patent and that said Letters Patent is hereby corrected as shown below:

In the Claims

Column 11, Line 28 (Claim 4) please change "positons where" to -- positions where --  
Column 12, Line 31 (Claim 10) please change "as α" to -- as Δ --  
Column 12, Line 36 (Claim 10) please change "(α/L)" to -- (Δ/L) --

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*